United States Patent [19]

Bauer

[11] Patent Number: 5,432,633

[45] Date of Patent: Jul. 11, 1995

[54] INTENSITY ADJUSTABLE OPTICAL SYSTEM

[75] Inventor: Robert Bauer, Rottweil, Germany

[73] Assignee: Hengstler GmbH, Aldingen, Germany

[21] Appl. No.: 56,951

[22] Filed: Apr. 30, 1993

[30] Foreign Application Priority Data

May 2, 1992 [DE] Germany ............... 42 14 654.2

[51] Int. Cl.$^6$ ............................................ G02B 26/02
[52] U.S. Cl. ................................ 359/229; 354/385; 354/389
[58] Field of Search ............. 359/888, 389, 385, 227, 359/229; 65/3.11

[56] References Cited

U.S. PATENT DOCUMENTS 4,414,749 11/1983 Johannsmeier ............... 359/385
4,812,635 3/1989 Kaufmann et al. ............ 359/888

Primary Examiner—Georgia Y. Epps
Assistant Examiner—Thomas Robbins
Attorney, Agent, or Firm—Dvorak and Traub

[57] ABSTRACT

Herein is described a process for the light-intensity balancing of an optical system, and a device for carrying out the process. The optical system consists of a light source, a lens installed in the beam path, and opto-electrical components that sends to an amplifier a signal that is proportional to the local light intensity. The intensity balancing is carried out by measuring and determining the intensity distribution in a plane. This local distribution is modified at the relevant points for the local distribution according to the optical properties of the lens until a uniform intensity distribution in the plane is obtained. The lens is attained by radiating its surface or internal structures with a laser.

11 Claims, 1 Drawing Sheet

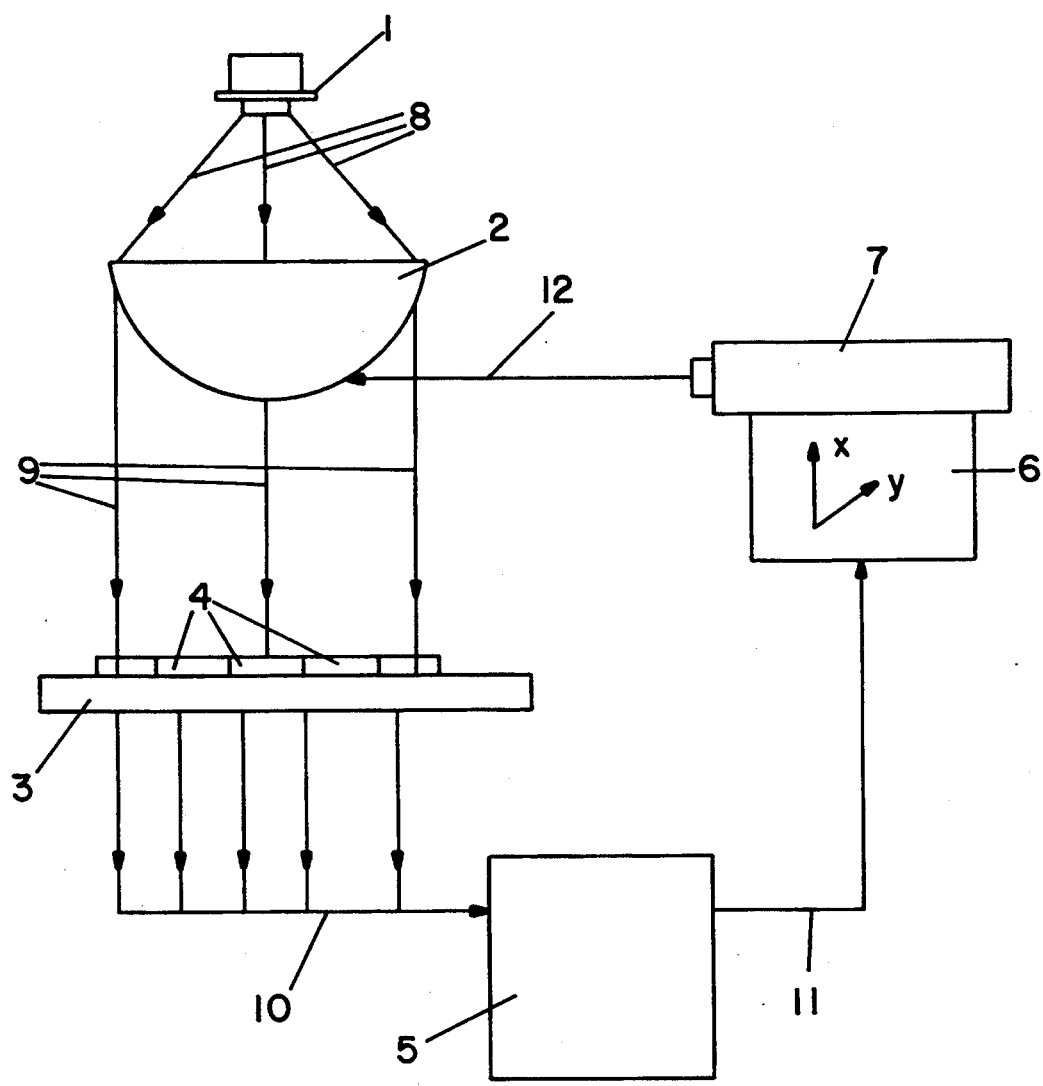
Figure

INTENSITY ADJUSTABLE OPTICAL SYSTEM

DESCRIPTION

This invention relates to a process for the light-intensity balancing of an optical system as well as for a device for the carrying out of the process.

Optical and/or optoelectronic systems have found acceptance in the sensor technology. It is known, for example, to use optical emitters as rotating emitters. These emitters consist of a light source, of a lens installed in the beam path of the light, as well as two photodiodes arranged below the lens. These photodiodes are electrically connected with an amplifier. The amplified signal should be symmetrical.

Because of tolerances and manufacturing irregularities of the components, the optical and optoelectronic systems have shown, however, that even with like designs, different signals are produced for the incident light radiation. Another problem is that the spatial distribution of the light energy in known systems can differ, which could cause an additional deviation from the desired behavior.

Thus, in order to obtain a symmetrical signal, it is necessary to balance the system.

It is known that the balancing of the system with respect to the intensity distribution can be obtained by inserting diaphragms or other non-transparent elements into the light path.

On the other hand, this balancing presents the disadvantage that a precise insertion of the diaphragms or elements is functionally very costly. It is costly because the balancing can be hardly automated. This, of course, results in increased costs for such a system.

It is also known that balancing can be obtained by adapting the signal from the photodetector by modifying it accordingly to the amplification, so that the amplifier amplifies a symmetrical signal.

The electronic balancing in solid-state integrated receiver circuits—the photodiode and amplifier are made out of the same silicon crystal—entails great expense because, in order to achieve this, electronic signals must be led through the crystal. These signals are susceptible to interferences. Direct balancing can also be provided by means of a microchip that must be appropriately designed for the laser beams.

This invention has the object to provide a process for light-intensity balancing, by means of which balancing can be achieved in a simple and reliable manner.

This problem is solved by a process for the light-intensity balancing according to the characteristics of claim 1. A device for carrying out the process according to claim 1 is a feature of the characteristics of claim 4.

Further advantageous embodiments are objects of the subclaims.

Contrary to the state of the art, the light intensity is balanced at the point at which the beam path to the optoelectronic components is originated, namely, at the lens. For this, the process is characterized in that the intensity distribution of the light striking the optoelectronic components is measured and determined in a plane. The intensity distribution at the lens is determined by means of a relevant conversion of the light intensity distribution in the plane. A uniform intensity distribution is obtained by changing the optical properties of the lens at the relevant points, so that the signal at the amplifier is formed symmetrically. This process presents the advantage that no additional elements, such as, e.g., diaphragms or the like, must be used. Also, the signal of an electrical component is not changed by appropriate measures by, e.g., the use of a potentiometer. This presents the advantage that the system consists of a reduced number of components. Another advantage of this process is, that the balancing produces a stable signal at the amplifier because of the absence of an eventual temperature variation at the potentiometer. It was advantageously evidenced that the balancing can be produced fully automatically, so that the manufacturing costs of the optical system can be reduced.

The optical property of the lens is advantageously modified by clouding the lens surface at its relevant point. The clouding of the lens is effected by means of a laser that bombards the appropriate point with photons. The laser beam modifies the structure near the surface.

However, it was also evidenced that the intensity balance can be achieved inasmuch as the structure at deeper layers of the lens can be modified by having the laser beams acting upon the appropriate point over a longer period of time or with increased energy.

For the carrying out of the process is proposed a device that presents a panel consisting of several optoelectronic elements, that are electrically connected with a plotting unit. The device also presents a positioning unit, of which the input is connected with the plotting unit and the output to a laser. The device is characterized by a simple design that can be used for the balancing of different optical systems.

For the radiant exposure of the lens, the wave length of the light emitted by the laser should be within the absorption spectrum of the lens. In this connection, the wave length of the laser must be adapted to the material of the lens in such a manner that the absorbed energy is sufficiently high to produce metabolism.

Practice has shown that $CO_2$-laser with 10 µm wavelengths are particularly appropriate for radiating materials, such as, e.g., plexiglas ®, methyl methacrylates or other synthetic; materials, because this wavelength is absorbed although the lens is highly transparent for visible light. The transparency of the lens is the premise for its use.

Advantageously, the laser is a pulsed laser, so that the clouding of the lens can be precisely controlled in view of the low penetration depth. Because of the laser's pulsed operation it is possible to control in an extremely precise manner the laser's energy; thus, the penetration depth can be adjusted to a micrometer range.

Further characteristics and advantages can be gathered from the below description of the embodiment of the device illustrated in the accompanying drawing:

The optical system consists of a light source 1, a lens 2 and optoelectronic components 4 arranged on a carrier plate 3. The light source 1 is mounted at the focal point of the lens 2 which can be supported by any supporting means. By way of example, the optoelectronic components can be photoelectric cells. The optoelectronic components 4 are electrically connected with a plotting unit 5. The output of the plotting unit 5 is electrically connected with a positioning unit 6. The positioning unit 6 triggers the laser 7 which is supported by a device (not shown) adapted to revolve the laser around the base to treat the whole lens.

The light source 1 emits light beams 8 that penetrate into the lens 2. The lens 4 is a collimator lens that aligns the light beams 8 of the light source 1 in a parallel manner. The light beams 9 emerging from lens 2 fall on the photoelectric cells 4. The photoelectric cells 4 send signals via an electrical circuit to the plotting unit 5. With a panel of photoelectric cells 4, the photoelectric cells 4 can be successively actuated in the plane by means of the plotting unit 5.

In the plotting unit, or control unit, 5 is determined the intensity distribution of the light in the plane. Based on this intensity distribution, an appropriate conversion is made to the coordinates of lens 2. The signals allocated to the coordinates are transmitted via an electrical circuit to the positioning unit 6, which aligns the laser 7 with the corresponding coordinate at lens 2. This point on the lens is clouded by bombarding it with the laser beam 12. This process is repeated until a uniform intensity distribution is obtained.

What is claimed is:

1. A process for the light-intensity balancing of an optical system with a light source, optoelectronic components supported on a common plane, a lens installed in the beam path between the light source and the components, positioning units, and an electronic amplifier that amplifies the signals produced in a rotating emitter for subsequent treatment, the process comprising the steps of:
   a) after the light passes through said lens, measuring and determining the light density distribution in a plane supporting said optoelectronic components,
   b) allocating the intensity distribution to a distribution at said lens, and
   c) modifying the optical properties of said lens at certain points, by means of a laser beam controlled by a control unit feeding a signal to said positioning unit for positioning the laser beam on said lens, to obtain uniform intensity distribution in said plane based on the momentarily measured intensity distribution in the plane.

2. A process according to claim 1 in which the surface of the lens is clouded at the appropriate points in order to obtain a uniform intensity distribution.

3. A process according to claim 2 in which the structure inside the lens is modified.

4. A device for carrying out the process according to claim 1 in which a panel made up of several optoelectronic elements, a control unit, that is connected with the elements, a positioning unit that is connected at its input with the control unit and at its output with a controllable laser beam emitter.

5. A device according to claim 4 in which a laser simulates light of a determined wavelength and with the wavelength within the absorption spectrum of the lens material.

6. A device according to claim 5 in which the laser is a $CO_2$ laser with a wavelength at 10 $\mu$m.

7. A device according to claim 6, in which the laser output is at least 1 W.

8. A device according to any of the claim 4, in which the laser is a pulsed laser.

9. A device according to claim 8, in which the laser output is at least 1 W.

10. A device according to claim 5, in which the laser is a pulsed laser.

11. A device according to claim 6, in which the laser is a pulsed laser.

* * * * *